(12) United States Patent
Puri et al.

(10) Patent No.: US 7,400,774 B2
(45) Date of Patent: Jul. 15, 2008

(54) ENCODING AND DECODING OF DIGITAL DATA USING CUES DERIVABLE AT A DECODER

(75) Inventors: Rohit Puri, San Jose, CA (US); Kannan Ramchandran, El Cerrito, CA (US)

(73) Assignee: The Regents of the University of California, Oakland, CA (US)

( * ) Notice: Subject to any disclaimer, the term of this patent is extended or adjusted under 35 U.S.C. 154(b) by 778 days.

(21) Appl. No.: 10/651,854

(22) Filed: Aug. 29, 2003

(65) Prior Publication Data

US 2005/0031219 A1 Feb. 10, 2005

Related U.S. Application Data

(60) Provisional application No. 60/409,093, filed on Sep. 6, 2002.

(51) Int. Cl.
*G06K 9/36* (2006.01)
*G06K 9/46* (2006.01)

(52) U.S. Cl. ......................... 382/238; 382/240
(58) Field of Classification Search .................. None
See application file for complete search history.

(56) References Cited

U.S. PATENT DOCUMENTS

| | | | | |
|---|---|---|---|---|
| 5,903,673 A | * | 5/1999 | Wang et al. ................. | 382/236 |
| 6,332,003 B1 | * | 12/2001 | Matsuura et al. ........ | 375/240.23 |
| 6,661,842 B1 | * | 12/2003 | Abousleman .......... | 375/240.11 |
| 6,717,990 B1 | * | 4/2004 | Abousleman ............... | 375/265 |
| 6,785,331 B1 | * | 8/2004 | Jozawa et al. .......... | 375/240.12 |
| 6,950,469 B2 | * | 9/2005 | Karczewicz et al. ... | 375/240.17 |
| 7,042,587 B2 | * | 5/2006 | Fiske ........................ | 358/1.15 |

* cited by examiner

*Primary Examiner*—Wenpeng Chen
*Assistant Examiner*—Yuzhen Ge
(74) *Attorney, Agent, or Firm*—Charles J. Kulas; Brian N. Young; Trellis IP Law Group, PC

(57) ABSTRACT

Encoding digital data by using cues at a decoder. An encoder selects an index to indicate a target codeword from the complete space of all codewords to a decoder. The index identifies a group or a set of codewords that contain the target codeword. The sets are represented by a bit-length that is smaller than the code word bit-length thus achieving compression. Two or more codewords in such a set are separated by a predetermined distance and all such sets of codewords considered together form the complete space of all codewords. The encoder sends syntax information, including the index, to specify the decoding. The decoder then uses a set of candidate cues in a comparison operation to determine the target codeword from the indexed set. Processing complexity can be allocated among the encoder, decoder and other possible devices as, for example, in a digital network.

28 Claims, 7 Drawing Sheets

ENCODER

DECODER

ENCODER

DECODER

ENCODING AND DECODING OF DIGITAL DATA USING CUES DERIVABLE AT A DECODER

CLAIM OF PRIORITY

This application claims priority from U.S. Provisional Patent Application Ser. No. 60/409,093 filed on Sep. 6, 2002 entitled "ROBUST, LOW-COMPLEXITY, HIGH-COMPRESSION DIGITAL ENCODING OF MULTIMEDIA USING CODING WITH SIDE INFORMATION," (02307V-129700US, B03-0081) which is hereby incorporated by reference as if set forth in full in this document for all purposes.

BACKGROUND OF THE INVENTION

This invention is related in general to representation of digital information and more specifically to a system where a representation of a target digital data is used to recover the target data with a data cue derivable at a device that assists in recovering the target value.

Digital compression techniques have become extremely important to reduce the size of digital content and thereby improve overall bandwidth of digital systems. For example, popular standards such as Moving Picture Experts Group (MPEG) promulgate various standards for compression of digital video. Many approaches to data compression are in use for various types of digital content such as video, still image, audio, etc.

A measure of the performance of compression and coding schemes is the "compression ratio." A compression ratio is a unit of the original content divided by the same unit's compressed size. For example, with schemes such as MPEG-2 and H.263 compression ratios of 20-30 are typically attainable.

A drawback of compression schemes is that they require digital processing to compress (or encode) the data at a transmitter, and also to decompress (or decode) compressed data at a receiver. Another property of many compression schemes is that higher compression ratios are only achieved by using more complex processing. In other words, to obtain higher compression ratios requires using more powerful and expensive processing chips, and results in a delay due to extended processing time. Low complexity processing typically achieves lower compression ratios.

For many of today's coding techniques e.g., digital video coding standards such as MPEG and H.26x, the overall complexity remains quite high and is unequally distributed between the encoder and the decoder. The encoder has a higher complexity and the decoder that operates in a slave mode to the encoder has a lower complexity. It is desirable to achieve a compression scheme that allows variance, management and distribution of processing complexity while also providing competitive compression performance.

For many of today's coding techniques such as digital video coding standards, the trend has been toward increasingly larger and more rigorous coding specifications, or syntaxes. This has resulted in higher compression ratios but has also made the compression schemes very inflexible. For example, the decoder operation is completely specified in terms of the prediction algorithm to be used. Every decoder must operate in the same way in order to successfully decode the highly specified syntax of the encoded streams. It is desirable to achieve a compression scheme that allows for more freedom in terms of algorithms that can be used at the decoder allowing smarter decoding algorithms to obtain better performance.

"Robustness" is the ability of a coding scheme to tolerate errors or dropouts in data and is another factor in data communication. Errors or dropouts can occur, for example, if a communication channel or physical link used to transfer data is "noisy" or otherwise prone to interference or deficiencies. Data corruption can also occur when data is being processed, stored or otherwise manipulated. Highly compressed data streams are usually more susceptible to errors that can occur during transmission than less compressed or uncompressed, data. Often, a compressed data stream transmission is made robust by adding forward error correction (FEC) codes to the compressed data stream or by allowing retransmissions (ARQ: Automatic Repeat reQuest) in case an error occurs. These approaches can require increased complexity and encoding delay. The latter results in increased delays and needs a communications channel in the reverse direction also. It is desirable to achieve a coding scheme that promises reliable performance with low complexity and low delay.

SUMMARY OF THE INVENTION

One embodiment of the invention includes techniques for compressing digital data by using cues at a decoder. In one approach, an encoder selects an index to indicate a target codeword from the complete space of all codewords to a decoder. Instead of referring to an individual codeword, the index identifies a group or a set of codewords that contain the target codeword. The sets are represented by a bit-length that is smaller than the code word bit-length thus achieving compression. Two or more codewords in such a set are separated by a predetermined distance and all such sets of codewords considered together form the complete space of all codewords. The encoder sends syntax information that contains the index to direct the decoder to use the specified set of codewords. The decoder then uses a set of candidate cues in a comparison operation to determine the target codeword from the specified set.

One embodiment includes a digital video compression application. In the digital video compression application the cues can be, for example, motion-based predictor vectors that are used to operate on the specified set of codeword vectors. The operation of a cue (e.g., a motion-based predictor vector) on a codeword in the specified set generates a result (e.g., a prediction error vector). For a particular cue, the codeword in the specified set that corresponds to the most likely result (e.g., smallest difference) is called its decoded codeword. A checksum is computed on the decoded codeword. This is compared with the checksum that is provided in the syntax by the encoder. The checksum provided by the encoder corresponds to the target codeword. A successful checksum match indicates that the target codeword has been identified. The candidate cues are tried successively until a successful checksum match occurs at which point the matching is declared to be successful. The motion predictors or other cues can, for example, be derived at the decoder, can be derived from information sent by the encoder or another source, or can be generated or otherwise obtained by any suitable means. In the digital video application the codewords include vectors that describe a unit of digital video such as a slice, block or frame of video information.

One embodiment of the invention allows processing complexity to be shared among the encoder and decoder while maintaining the system compression performance. If there is a large amount of processing resources at the decoder, for example, then the decoder can employ more powerful prediction algorithms and use all the candidate cues so generated and the encoder can have relatively lower complexity In some cases, the encoder can use some of the candidate cues, operate them successively on the specified set and send the result of the checksum matching to the decoder. In the case of success, it can also indicate the cue that resulted in success to the decoder. In case of failure, the decoder uses the remaining candidate cues to operate them on the specified set. This allows processing complexity to be distributed in an arbitrary way between the encoder and the decoder. Thus in some cases increased decoder complexity results in decreased encoder complexity and vice versa. Robustness, data rate, end user subscription policies, and other factors can all be used to adjust complexity and performance. In a networked approach, portions of the encoder and decoder processing can occur at any processing node in the overall transmission system. The transmission system might include processors or other resources that may exist in network components, such as servers, routers, switches, storage arrays, etc., that can be used to perform encoding and/or decoding operations. Allocation of complexity can be predetermined or can be dynamic, with the allocation taking place in real-time, or near real-time, according to demand or design.

One embodiment provides a syntax that allows substantial design leeway at the decoder. This makes it possible, for example, for different decoders to have different resources and levels of processing complexity and to still successfully decode an encoded stream according to the syntax. For example, one embodiment allows digital video decoding to be implemented without requiring a highly specific motion estimation algorithm. Depending on the motion estimation algorithm employed, different decoders can come up with different sets/ordering of candidate cues, and use them to operate on the specified set.

One embodiment of the invention provides the property of robustness. Any of multiple candidate cues that result in successful checksum matching provides a successful decoding. This makes it possible, for example, in the digital video coding application to decode successfully even if some parts of the reference frame data (that are used to come up with the motion predictor vectors) are lost.

A preferred embodiment uses a relatively high-complexity decoder with a relatively lower-complexity encoder. The space of codewords is partitioned into multiple sets each containing a group of codewords. Partitioning takes place according to a definition in the syntax. The sets are represented by a bit-length that is smaller than the code word bit-length. The index of the set containing the target codeword is made known to the decoder instead of an index for the individual codeword for achieving compression. For decoding, candidate cues (e.g., such as within a predetermined Hamming distance) are used to identify a specific codeword from the indicated set of codewords. In some embodiments, a same compressed stream from an encoder can be sent to multiple decoders having candidate cues that are different but within the specified distance.

The encoder can be of relatively low complexity since its major tasks are to partition the source code word space into sets of code words and generate index labels for these sets. The decoder can be of relatively higher complexity as it may derive candidate cues and apply them to sets of codewords and perform comparisons to determine a selected code word.

The compression can be robust since, at the decoder, any of multiple candidate cues that are within the predetermined distance can be used to identify a specific codeword from an indicated set of codewords. In some approaches this allows, for example, loss of data without unduly affecting the decoding of subsequent data.

The approach of a "low complexity encoder" with a "high complexity decoder" can be combined with conventional "high complexity encoder" and "low complexity decoder" approaches to place the bulk of compression and coding processing into, e.g., a digital network, as opposed to user devices. For example, in a cellular telephone application, a first user can use the low complexity encoder according to the present invention to transfer voice information from a user's handset to a digital cellular network. Within the cellular network, a high complexity decoder, according to the present invention, can be used to decode the encoded information. This decoded information is re-encoded using any suitable high complexity encoder in the network. A smart network processing unit can use the decoding process of the high complexity decoder to reduce the encoding complexity of the high complexity encoder that follows. The re-encoded information is then transmitted to a target user's handset where a low complexity decoder is used to convert the data to audible sound signals. Thus, the low complexity processing is performed at the hand sets while the high complexity processing is performed in network components, or components or devices associated with the network.

In one embodiment the invention provides an apparatus for encoding digital information, wherein a processor executes instructions, the apparatus comprising one or more instructions for deriving a code word for representing at least a portion of the digital information; one or more instructions for determining a cue for the derived code word; and one or more instructions for selecting an index based on the cue and derived code word; wherein the index identifies one of a plurality of sets of code words, wherein two or more code words within a set are separated by a distance.

In another embodiment the invention provides a method for decoding encoded digital information, the method comprising receiving an index; using the index to determine a set of candidate code words; checking the code words in the set to determine a matching code word; and using the matching code word in a decoding operation on the encoded digital information.

DETAILED DESCRIPTION OF THE INVENTION

A preferred embodiment of the invention is included in a coding scheme referred to as PRISM, a shorthand name derived from "Power-efficient, Robust, high-compression, Syndrome-based, Multimedia coding." PRISM has been developed and tested by the University of California at Berkeley and is described, for example, in publications such as "PRISM: A New Robust Video Coding Architecture Based on Distributed Compression Principles," 40th Allerton Conference on Communication, Control and Computing, Allerton, Ill., October 2002. It should be apparent that the specific steps of the PRISM approach and other embodiments detailed herein can be modified and supplemented. Steps can be added to, or taken from, the various embodiments to achieve, for example, design tradeoffs among speed, compression ratio, efficiency, resource use (e.g., processing cycles, memory, bandwidth, etc.), cost and other considerations. Other coding approaches and techniques, including those taught by the prior art and subsequent art, can be used in varying ways and to varying degrees with the techniques of the present invention.

Figure 1:
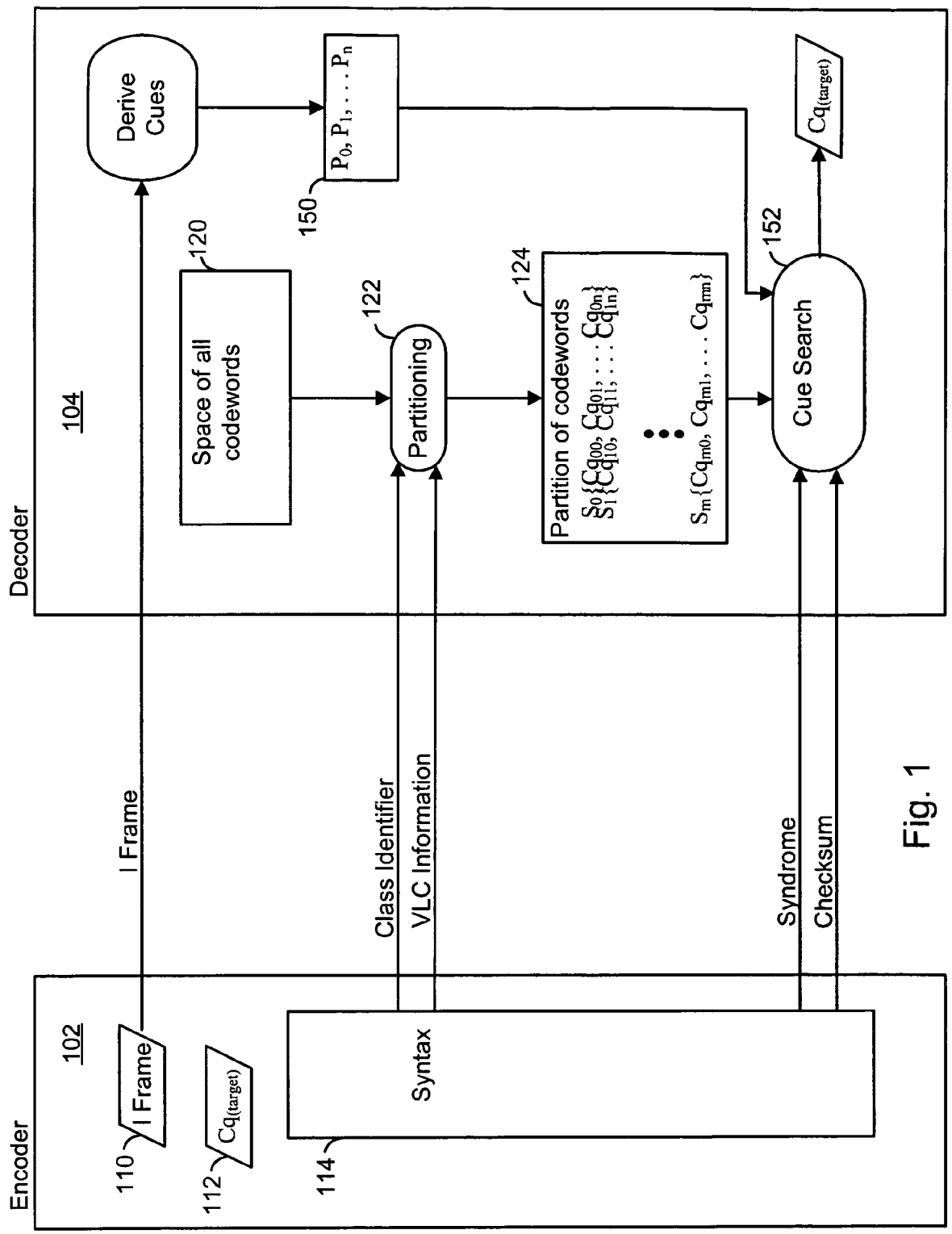
FIG. 1 illustrates basic features of the transfer and processing of syntax information.
Figure 2:
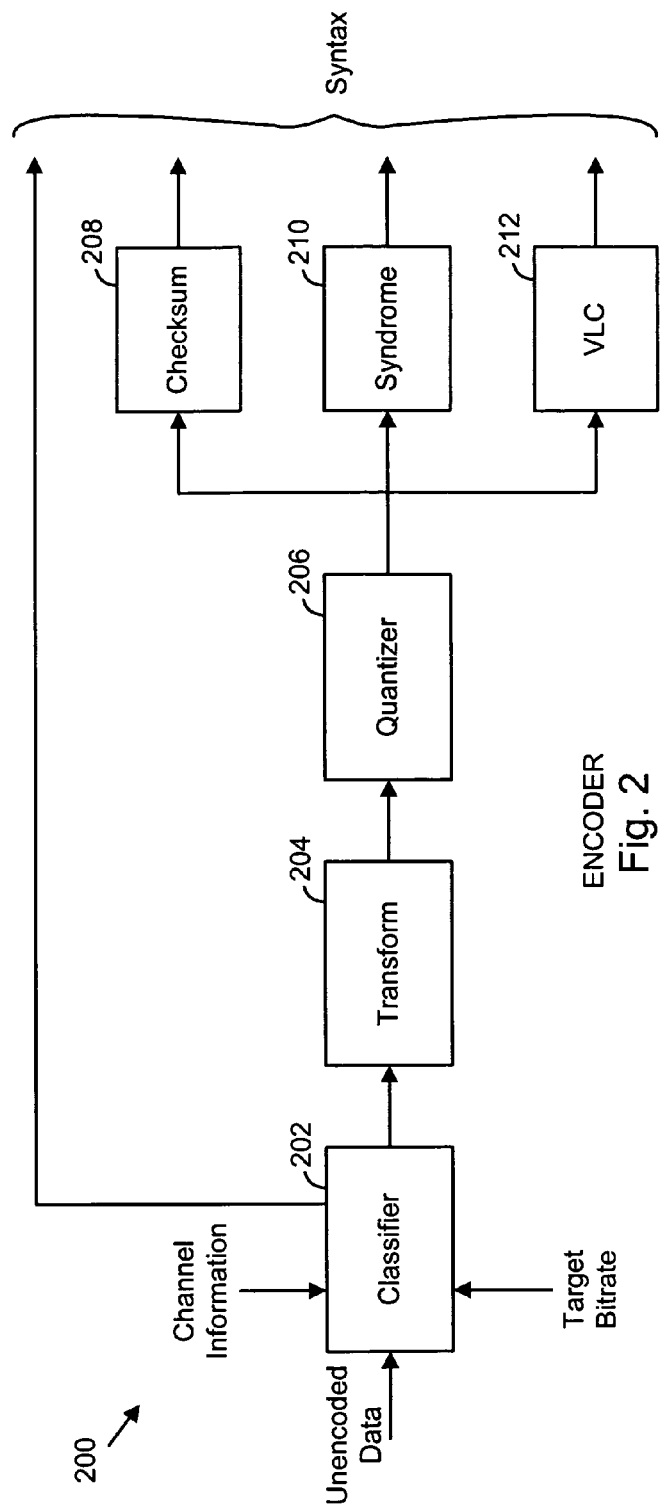
FIG. 2 illustrates basic components of an encoder.
Figure 3:
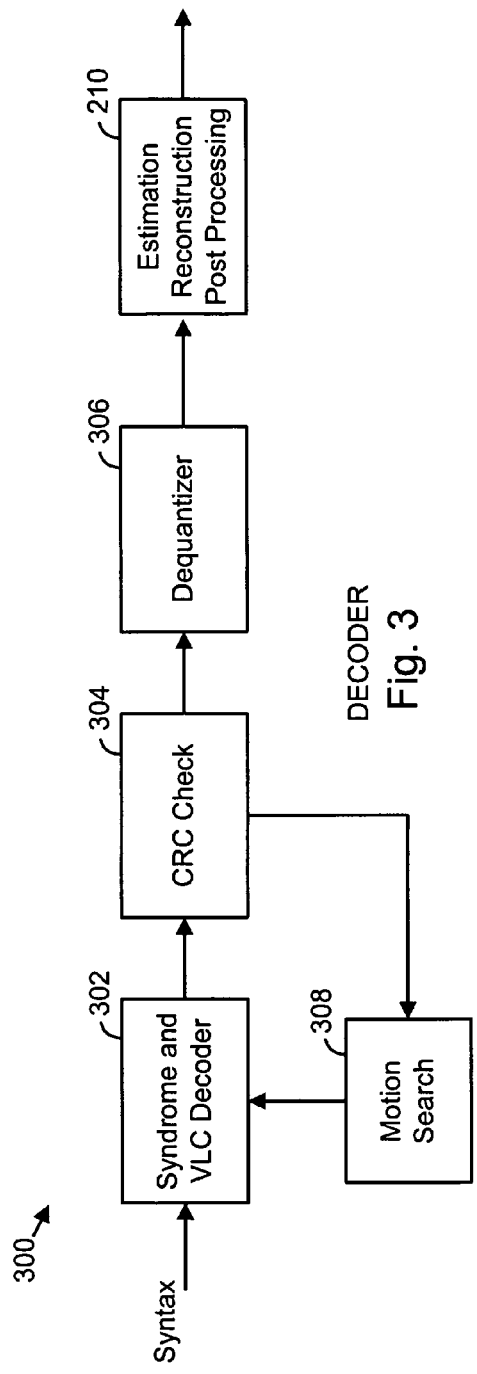
FIG. 3 shows basic components of a decoder

First an overview of encoding, decoding and the use of syntax information is presented in connection with a discussion of FIGS. 1-3. Next, more details of an encoder and decoder design are provided in connection with a discussion of FIGS. 4 and 5. The ability to allocate complexity among processors is shown. Finally, test results of a preferred embodiment are presented.

Overview

FIG. 1 illustrates basic features of the transfer and processing of syntax information to achieve decoding.

In FIG. 1, encoder 102 desires to convey a quantized target codeword 110, $Cq_{(target)}$, that belongs to the space of all possible codewords 120, to decoder 104. The codeword can be any value, or values, depending on the nature of the information being encoded. For example, where digital video is being transferred from the encoder to the decoder, the quantized target codeword can be a vector of quantized discrete cosine transform (DCT) coefficients for a unit of image information such as a block or frame.

In one embodiment the decoder executes a process to generate codewords to represent the possible space of all codewords 120 (also known as the "source codebook"). Other embodiments can use different approaches such as to pre-store the space of all codewords at a time of manufacture, receive the space of all codewords from an external source (e.g., the encoder or another source), use a default space of all codewords, etc.

The encoder and decoder agree on the space of all codewords to determine a partitioning of codewords that will be used in the decoding process. In one embodiment, the encoder uses syntax information to indicate the partitioning of codewords to the decoder. Characteristics of the partitioning of codewords are indicated with a "class identifier." Other information that is part of the syntax includes a syndrome and a checksum. Partitioning process 122 is executed by the decoder to use the class identifier to create, or define, partition of codewords 124 from the space of all codewords. Processes to define or generate the space of all codewords and a partition of codewords can be stored in a device at the time of manufacture in, e.g., non-volatile memory or can be communicated between the encoder to the decoder through an initial communication. The process of defining the partition of codewords is described in more detail, below.

The partition of codewords includes multiple sets, $S_1$, $S_2, \ldots S_m$, of quantized codewords. For example, each of the sets, $S_j$ where j=1 . . . m in FIG. 1 include quantized codewords $Cq_{j0}, Cq_{j1}, \ldots Cq_{jn}$. In general, specific arrangement, type and number of values, variables or other characteristics of data components are used primarily for ease of discussion and are not necessary to practice the invention. For example, the number and organization of codewords in a set, and the number of sets in the space of all codewords can vary. Each set need not have the same number or type of codewords as another set. Other embodiments can have different approaches to defining a partition of codewords. For example, a definition of the partition of codewords can be transferred, in whole or in part, from the encoder to the decoder, or obtained by one or both of the encoder and decoder from another source.

The partition of codewords need not depend on any predetermined space of all codewords. In general, any approach to defining and agreeing upon a partition of codewords is possible. In some embodiments it may not be necessary for the encoder and decoder to be in complete agreement on the partition of codewords.

The decoder derives a set of cues 150. The set of cues or predictors is based on previous data available at the decoder. The set of cues can include any number of items such as vectors, values or other data structures that can have a correlation to a target codeword. In a digital video application, cues include predictors, $P_0, P_1, \ldots P_n$. The predictors can be of any suitable type. For example, in a digital video application the codewords and predictors can be vectors of 8×8 or 16×16 values where the values correspond to discrete cosine transform (DCT) coefficients for picture element ("pixel") values in a portion of an image to be displayed. In general, the codewords, predictors and other units of information described in this application should be understood to include any format of number, symbol or data representation, and any amount of data included in any arbitrary data structure (e.g., constant, variable, array, string, object, etc.).

Any suitable method can be used to derive the cues, depending on the application. For example, in a digital video application where video is encoded using one of the popular Motion Picture Experts Group (MPEG) standards (e.g., MPEG-4) the encoder can first provide an I-frame to the decoder. The decoder can then use a standard motion predictor procedure to generate a set of predictors, such as predictors 150. These predictors can be used to decode the next frame following the I-frame from the syntax information. Subsequently these decoded frames can be used to generate predictors for the next frame and so on. Other approaches can use different procedures for generating a set of cues such as obtaining the cues from the encoder or another source, deriving the cues, using pre-stored cues, etc.

Cue search and comparison process 152 uses a syndrome, or index, passed from the encoder to identify the set (from among the multiple sets) that contains the target codeword $Cq_{(target)}$. The identified set's codewords are successively operated on by a first candidate cue in the set of cues 150. For example, in a digital video application, the operation can be a difference function between the candidate cue and a codeword. The result of the comparison operation is, for example, the mean squared value of the residual vector. Note that the operation of a cue on a codeword in the identified set can be any type of operation. The operations are performed on the codewords in the identified set and the results are used to determine the best candidate codeword based on the operations. In a digital video embodiment the best candidate codeword is typically that is associated with the smallest mean squared value for the residual vector. A checksum is generated across the best candidate codeword (or codewords) and is compared against an encoder checksum for the target codeword $Cq_{(target)}$ received by the decoder from the encoder. If the checksums match then the target codeword $Cq_{(target)}$ is declared to have been discovered. With a strong enough checksum function, the likelihood of decoding the correct target codeword can be made arbitrarily large. If no checksum match is discovered then a next candidate cue is chosen from the set of cues and the search continues by applying the next candidate cue to the codewords in the identified set. If all cues have already been tried then the detection of the target codeword has failed. In a preferred embodiment, the undiscovered codeword is simply ignored, or not used. Other embodiments can take other approaches such as sending an error indication, using a default codeword, retrying with different parameters etc.

FIG. 2 illustrates basic components of an encoder in a digital video embodiment.

In FIG. 2, encoder 200 accepts multimedia data (e.g., digital image and or audio data) as input for encoding. The input data is processed by classifier 202. Classifier 202 can optionally receive information about a physical channel used for transmission and a target bitrate. The physical channel information can describe the reliability, or expected data loss rate of, e.g., a hardwired link, radio-frequency broadcast, etc., so that the reliability of the channel can be used in the classification step. The target bitrate can be specified so that the encoder can attempt to obtain a desired quality level, attempt to limit bandwidth requirements, or to regulate the bitrate for other reasons. The classifier uses the information to estimate the level of correlation with available data at the decoder and uses that to determine the partitioning of the codeword space. The class identifier is included in the syntax information in connection with FIG. 1, to indicate to the decoder the partition of codewords.

Once classified, the input data is supplied to transform 204. In the preferred embodiment the data is subjected to a DCT and other processing that is typical of an MPEG compression standard. Note that in some cases, depending on the classification of data, no transform, or a limited transform, or some other transform (e.g., a wavelet transform) may be used.

Quantizer 206 is used to quantize the coefficients (or other values) output from transform 204. Quantizer 206 performs the quantization according to, e.g., a target image quality, bitrate, or other goals or constraints. Checksum processing 208 includes computation of a cyclic redundancy check (CRC) on the quantized information that is included as part of the syntax information. Syndrome 210 determines the syndrome, or index corresponding to the quantized coefficients, to send to the decoder. A fraction of the quantized coefficients are encoded using syndromes and the remainder using VLC 210 which determines the VLC parameters. Outputs from the Classifier, Checksum, Syndrome and VLC processes are included in the syntax information sent to the decoder.

FIG. 3 shows basic components of a decoder in a digital video embodiment.

In FIG. 3, decoder 300 receives syntax information (and other information not shown) from the encoder as an input to syndrome decoder 302. As described above, the decoder cycles through a comparison of a set of candidate predictors against the set of codewords by using motion search 308 and checksum 304 operations. Once the desired, or target, codeword is discovered it is processed by dequantizer 306 and provided to additional optional processing such as estimation, reconstruction and post processing as shown at 310.

Encoder Details

Figure 4:
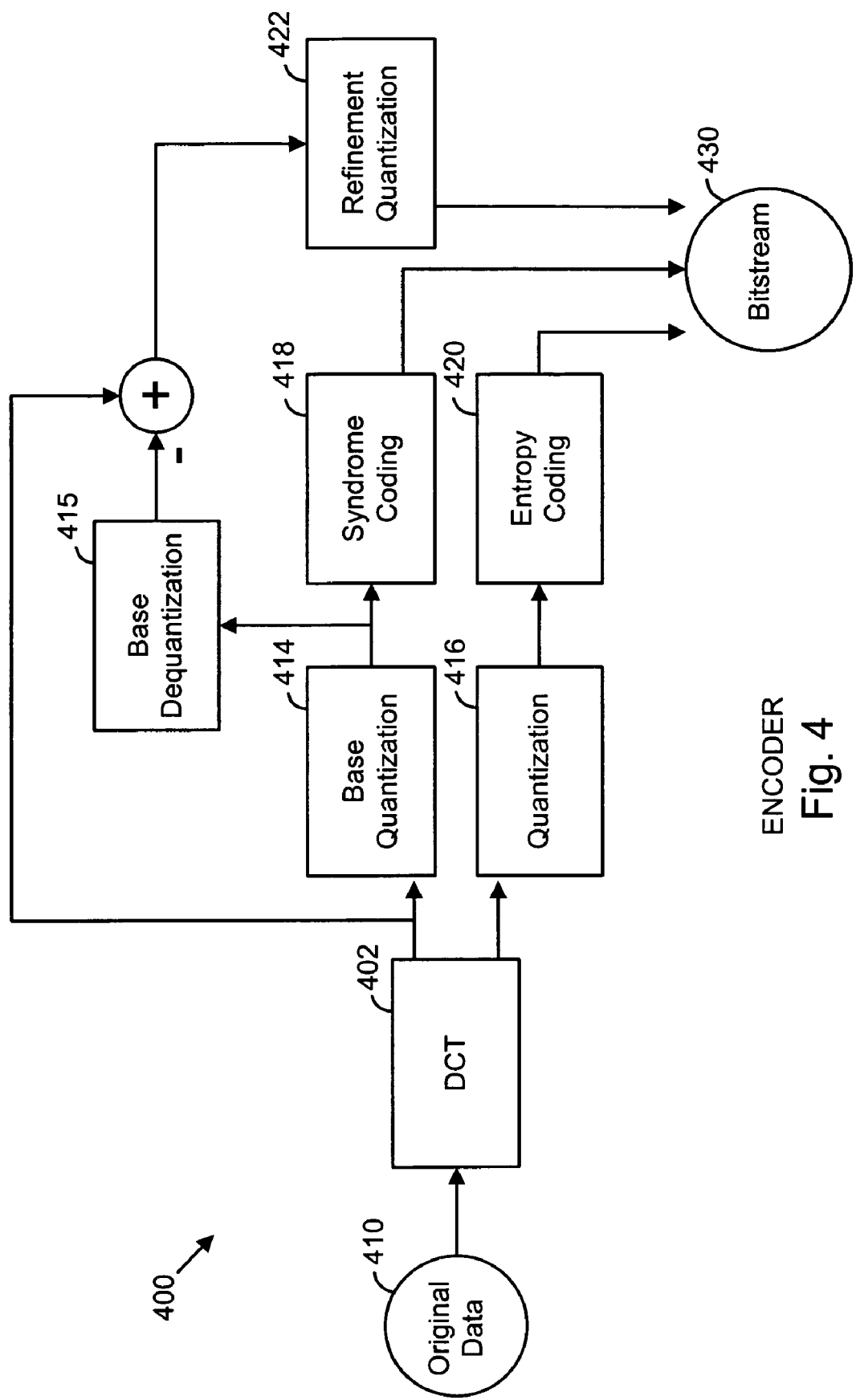
FIG. 4 shows a block diagram of an encoder including additional features.

FIG. 4 shows a block diagram of an encoder according to an embodiment of the present invention.

In FIG. 4, encoder 400 accepts input data 410 that is submitted to a blockwise discrete cosine transform (DCT) and zig-zag scan operation at 412. Top and bottom portions resulting from the operations of 412 are submitted to base quantization 414 and quantization 416, respectively. The output of base quantization 414 is subjected to syndrome coding at 418 which is output as bitstream 430. The output of the base quantization 414 is dequantized at 415 and its residue with respect to the input data subjected to refinement quantization 422 and output as bitstream 430

The "bottom fraction" output from the operations of 412 is subjected to quantization 416 and is entropy coded at 420 to be output as part of bitstream 430.

A preferred embodiment encoder divides a video frame to be encoded into non-overlapping spatial blocks. For example, 16×16 or 8×8 blocks of pixels can be used. The main steps of encoding are as follows:

1. Classification: Typical video sequences are heterogeneous sources. Within the same sequence, some blocks that are a part of the scene background do not change much with time. That is, they are highly correlated with their predictors and have small correlation noise, N. On the other hand, blocks that are a part of a scene change or occlusion can have little correlation with the previous frame, and have a large N.

Thus, within the same frame different blocks can have different degrees of correlation with the previous frame. The classification step aims at estimating the extent of correlation that is available at the decoder and determines the appropriate transform, quantization and syndrome coding strategy. In the preferred embodiment, the block frame differences (i.e., a simple difference between the current block and the block in the previous frame in the same location) is used as a cue to classify the current block. Four bits are used to represent 16 different coding modes or classes.

At one extreme of the coding classes is a "skip" mode, where the frame difference is so small that the block is not encoded at all. At the other extreme is the "intra" mode where the frame difference is very large suggesting poor correlation so that intra-coding is appropriate. The other 14 classes are 14 different syndrome coding modes in between these two extremes. The main computation carried out in the Classification step is the evaluation of the block frame difference. The difference evaluation is a short, simple computation that is linear in the number of coefficients 2. Transform Coding: Blocks are transformed from the pixel domain to the frequency domain using the two-dimensional discrete cosine transform (DCT). Other embodiments can use different transforms such as a fast-Fourier transform (FFT), modified DCT, etc. The frequency domain transform step uses the spatial correlation in a block to achieve compression and other advantages.

Figure 6:
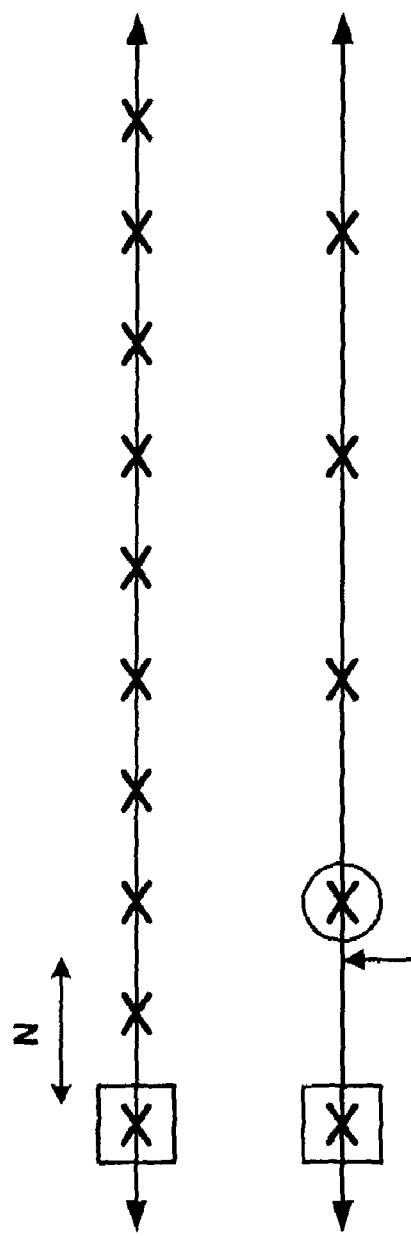
FIG. 6 is a diagram showing the effects of quantization on an observed codeword.

3. Base Scalar Quantization: The DCT coefficients are quantized before encoding. For quantization, the choice of the step size is limited by the statistics of N. This is illustrated in FIG. 6. Here the top line shows the quantized codeword set for X, and the two bottom lines show the partition of the space of quantized codewords. The rectangular box shows the observed codeword which lies in the first partition. Since the magnitude of N is more than the quantization step size, the decoder uses the side information (cue) Y to decode the incorrect (circled) codeword. Thus, each of the elements of X is quantized with a step size proportional to the standard deviation of the corresponding element in N. In FIG. 6 the top line shows the quantized codewords for X. The bottom two lines show the two partitions of the quantized space of all codewords of X. The box shows the observed codeword. The observed codeword lies in the first partition. The magnitude of N is more than the quantizer step size. Hence, the decoder decodes the circled codeword and makes a decoding error 4. Zig-Zag Scan: The quantized coefficients are arranged in a 1-dimensional order (size 256 or 64) by a doing a zig-zag scan on the 2-dimensional block (size 16×16 or 8×8). In general, arranging 2-dimensional coefficients in a 1-dimensional order using a zig-zag scan pattern tends to organize the coefficients in decreasing order of energies (i.e., importance).

Figure 7:
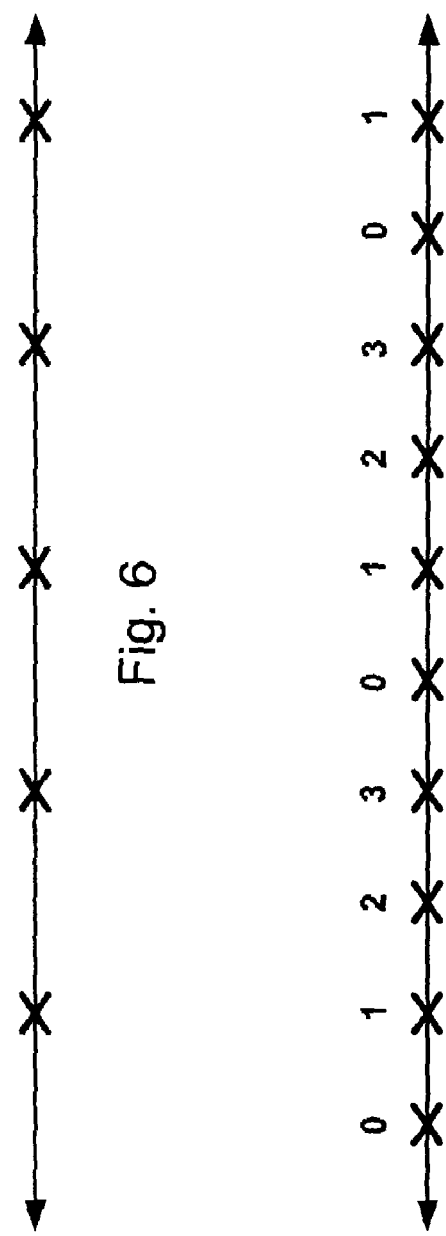
FIG. 7 shows mod-4 labeling of codeword space.

5. Syndrome Encoding: The space of quantized codewords that has been appropriately generated using the statistics of N is partitioned. Partitioning can be by using a Euclidean space trellis channel code as is known in the art. Other partitioning approaches are possible, such as with turbo codes, LDPC codes etc. The preferred embodiment uses a memory-7 rate-½ trellis code such as that described in, e.g., G. D. Forney, "Coset Codes-Part I: Introduction and Geometrical Classification," *IEEE Transactions on Information Theory*, vol. 34, pp. 1123-1151, September 1988. A rate-½ trellis code of block length N is a subspace of $\{0, 1, 2, 3\}^N$ (The repetition channel code of block length 3 ([0 0 0] and [1 1 1]) is a subspace of $\{0, 1\}^3$. Hence, it can be used to partition the space $\{0, 1, 2, 3\}^N$. For this reason, we need to "convert" the space of quantized codewords to $\{0, 1, 2, 3\}^N$. This can be done by using a mod-4 labeling of the quantization lattice as shown in FIG. 7.

The transmission or the coset index rate incurred in this case is 1 bit/sample. The generation of the coset index (syndrome) associated with each codeword can be accomplished in a computationally efficient manner through a simple convolution operation (linear in the number of coefficients) between the quantized codeword and the parity check matrix of the trellis code.

In the preferred embodiment, only a first portion of the scanned coefficients in each block of each class are syndrome encoded. The remaining coefficients are purely intra-coded. This is an efficient approach since, for typical natural images, the first few transform coefficients contain most of the information about the block. Thus, the first few transform coefficients can be expected to have significant correlation with the corresponding predictor blocks. Improved results were obtained in tests of the preferred embodiment using both 8×8 blocks and 16×16 blocks when only about 20% of the coefficients were syndrome encoded.

6. "Pure" Source Coding: The remaining coefficients which comprise about 80% of the total coefficients are intra-coded in the conventional way. The coefficients are first quantized, then zig-zag scanned and finally are entropy coded using run-length Huffman coding.

7. Refinement Quantization: A target reconstruction quality corresponds to a particular quantization step size. Higher desired quality is a result of a finer quantization step size and lower quality results from a coarser quantization step size. The coefficients that are purely intra-coded are quantized with a step size corresponding to the target quality. But, for the coefficients that are syndrome encoded, the choice of the base quantization step size is limited by N. This is done to minimize the probability of decoding error. Hence, assuming that the base quantization interval can be conveyed correctly with high fidelity to the decoder, we refine it further to the target quantization step size. In a preferred embodiment, the refinement operation includes a progressive sub-dividing of the base quantization interval into intervals of size equal to the target quantization step size. The index of the Refinement interval inside the base interval is transmitted to the decoder.

8. Cyclic Redundancy Check (CRC): We note that, at the encoder, encoding is done in principle with respect to the statistics of the motion compensated prediction error between the block, X, that is to be encoded and the "best" predictor Y for this block in the frame memory. At the decoder, all that is available is the frame memory. The decoder does not know the "best" predictor for the block X.

The encoder transmits not only the syndrome for the encoded coefficients but also a CRC check (of sufficient strength) of the quantized sequence of codewords. The CRC check serves as a "signature" of the quantized codeword sequence. The decoder searches over the space of candidate predictors one-by-one to decode a codeword from the set labeled by the syndrome. When the decoded codeword matches the CRC check, decoding is declared to be successful. Note that the CRC needs to be sufficiently strong so as to act as a reliable signature for the codeword sequence.

Decoder Details

Figure 5:
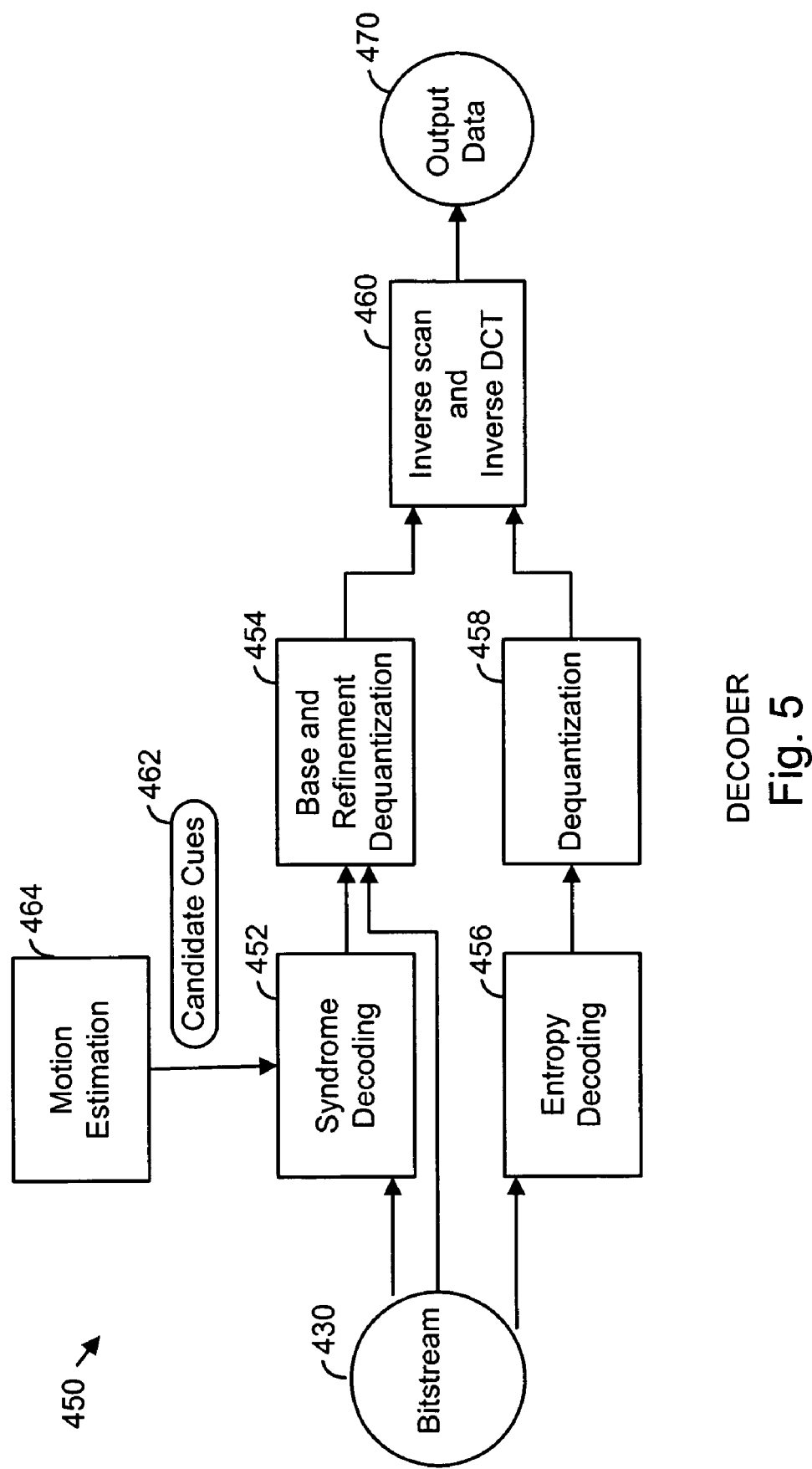
FIG. 5 shows a block diagram of a decoder including additional features.

FIG. 5 shows a decoder for decoding bitstream 430 output from encoder 400 of FIG. 4 to reconstruct, or approximately reconstruct, original data 410.

In FIG. 5, decoder 450 accepts bitstream 430 and processes different portions of the bitstream according to syndrome decoding 452, entropy decoding 456 and base and refinement dequantization 454. Motion estimation 464 generates candidate cues 462 to provide, values, (e.g., predictors) for syndrome decoding 452. The output of syndrome decoding 452, along with information from bitstream 430, is sent to base and refinement dequantization 454. The output of entropy decoding 456 is used as input to dequantization 458. The outputs of both base and refinement dequantization 454 and dequantization 458 are sent to inverse scan and inverse DCT 460 which generates output data 180 that is the same as, or a suitable approximation of, original data 410 of FIG. 4.

The PRISM decoder incurs a relatively high decoding complexity. In one embodiment the main modules include the following (other embodiments can vary in the number and type of modules):

1. Cue Generation (Motion Search): The decoder does motion search to generate candidate cues (predictors) to decode the sequence of quantized codewords from the set indicated by the received syndrome or derive them by any other means. In one embodiment, exhaustive half pixel motion search is used to obtain various candidate predictors. Any suitable motion search can be used, including those described in the prior art; and other present or future techniques. For example, multi-frame prediction, optical flow, control grid interpolation, etc., can be used. The choice of more sophisticated and computationally complex approaches can improve the overall quality (e.g., visual quality and accuracy) of the decoded digital information. Simpler approaches can result in suitable quality and reduce the cost of a device, permit a device to achieve desired frame rates, or provide other design tradeoffs.

2. Syndrome Decoding: Each of the candidate predictors generated by the motion search module is used to decode a quantized codeword from the set indicated by the syndrome. A preferred embodiment uses a 128-state rate-½ trellis code such as that disclosed in "Coset Codes-Part I: Introduction and Geometrical Classification," G. D. Forney, IEEE Transactions on Information Theory," vol. 34, pp. 1123-1151, September 1988, including decoding using a Viterbi algorithm. Note that any suitable type of syndrome decoding can be employed. The set of all codewords labeled by the received syndrome is represented on a trellis. The Viterbi algorithm is then used to identify the codeword in this set that is nearest to the candidate predictor. If this decoded codeword matches the CRC check, then the decoding is declared to be successful. Else using the motion search module, the next candidate predictor is obtained and then the whole procedure repeated.

3. Estimation and Reconstruction: Once the quantized codeword is recovered, it is used along with the predictor to obtain the best reconstruction of the source. In the preferred embodiment, the best linear estimate from the predictor and the quantized codeword is used to obtain the source reconstruction. However, any signal processing algorithms (e.g., spatio-temporal interpolation) or post processing mechanisms can be deployed in this framework to improve or modify the overall performance.

4. "Pure" Source Decoding: For the coefficients (about 80%) that have been intra-coded, the decoding action includes entropy decoding followed by dequantization.

5. Inverse Zig-Zag Scan: Once all the transform coefficients have been dequantized, the zig-zag scan operation carried out at the encoder is inverted to obtain a 2-D block of reconstructed coefficients.

6. Inverse Transform: The transformed coefficients are then inverted using the inverse transform so as to give reconstructed pixels. Some characteristics include the following:

a. The encoding/decoding approach described above provides low encoding complexity that can approach intra-coding (e.g., "I-frame" encoding). The need for motion search at the encoder, which can typically cost over 65,000 operations/pixel/second, can be reduced or eliminated in the preferred embodiment. Operations like motion search that are performed by the encoder in the conventional paradigm can be performed by the decoder in the framework of the invention. Further, since motion estimation is not performed at the encoder, frequent memory accesses to load the frame memory can be avoided so that power consumption and delays are reduced. This makes the approach of the invention suitable for wireless scenarios where the encoding devices are constrained by battery power. The block-by-block encoding approach used in the invention exhibits data level parallelism and is well-suited for implementation over multi-threaded architectures.

b. Substantial reduction in encoding complexity can be achieved without overly compromising the compression efficiency of the encoder. Efficient compression reduces the size of the bit-stream and thus minimizes the total transmitted power. Complexity can be transferred from an encoder to a decoder, as desired.

c. Robustness, or resistance to data errors, can also be realized since the joint source-channel coding framework of the invention can be more robust to transmission losses than conventional predictive coding paradigms. For example, conventional paradigms are fragile in the sense that the loss of the predictor can render the residue information useless since the residue information is dependent on the predictor for decoding. The use of syndrome encoding can ensure that the same partitioning works for all realizations of the sources as long as they satisfy the joint statistics. For example, if the frame memory does not have the previous frame due to transmission loss but only the frame prior to it, then as long as that frame is correlated enough so that it is "matched" to the partitioning it would still be usable for decoding. This is of significant value in dealing with the drift problem in the prior art where an error in a frame can compound the error to other frames derived from the frame that includes the error.

The drift problem in video coding is an artifact of the predictive coding framework. When, for some reason, the frame memories at the encoder and the decoder are not identical, then the residue error is encoded at the encoder off some predictor and decoded at the decoder off some other predictor. Scenarios like transmission losses, unequal machine precision at the encoder and the decoder etc. can lead to non-identical frame memories. The drift between the encoder and the decoder keeps accumulating and propagating and can lead to very displeasing visual artifacts. Drift between the encoder and the decoder can be corrected when they are synchronized by an intra-coded frame.

d. The encoder can use information about a transmission channel, or other factors, to dynamically select a coding strategy to match the channel conditions so as to maximize the delivered quality at the decoder. Such selection can be a continuous trade-off between compression efficiency and robustness. That is, by decreasing the coding efficiency (incurring more rate for coding the same quality) the bit-stream can be automatically made more robust to transmission losses. This is of great value in scenarios where network feedback is available. The encoder upon estimating the channel loss rate from the feedback can dynamically adapt the coding strategy to match it to the channel conditions at hand. The base quantization step size is a key tunable parameter here. If this step size is chosen more coarsely than is required by the existing correlation, then this means that syndrome decoding would be successful even for weaker correlations.

Thus, if some parts of the previous frame have been lost, then the corresponding parts from the frames before the previous frame, even though they are weakly correlated as compared to the current frame, can be used for decoding. A coarser quantization step size, however, means a greater Refinement layer rate for attaining the same desired quality. This ability to "tune" the base quantization step size thus allows selecting a degree of robustness vs. bitrate. The selection can be made on factors such as image or sound quality, maximum or minimum bandwidth, channel noise, or other characteristics such as whether an end user is subscribing to a high or low level of service. The selection can be made prior to, or during, encoding or decoding operations. Selections can be by a processor in the encoder, decoder or elsewhere. The selection can be done dynamically, in real time as a data transfer is taking place. In some embodiments it may be desirable to adjust one of the properties (i.e., robustness or bitrate) without regard to the other. Other embodiments may use the teachings of the present invention to adjust other transmission or coding properties in a similar manner.

e. A Flexible Encoding Syntax: The syntax can allow variation among decoders for a given syntax. For example, where the syntax specifies a partitioning in the class identifier, but does not specify a motion prediction operation any of multiple decoder designs can be suitable using any suitable motion prediction, or other operation. The syntax can accommodate many different types of decoders that are compatible with the given syntax. This allows great flexibility in the design of algorithms or techniques for, e.g., motion estimation, error concealment, post processing etc. and other sophisticated signal processing tasks.

Figure 8:
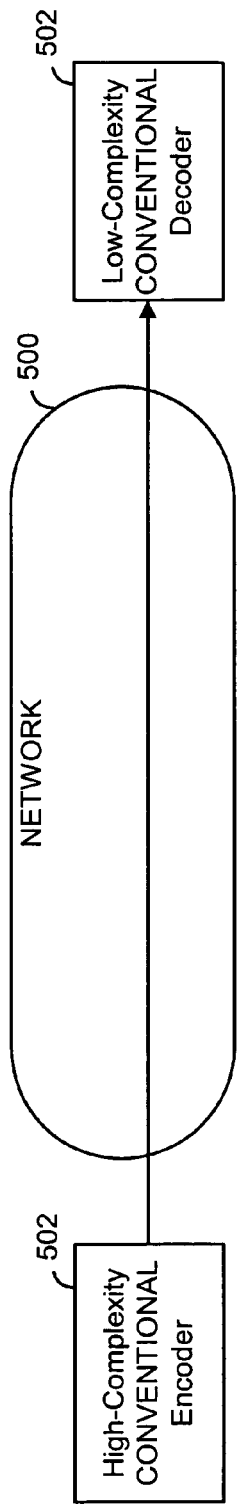
FIG. 8 illustrates a prior art approach to sending information from an encoder to a decoder.

FIG. 8 illustrates a prior art approach to sending information from encoder 502 to decoder 504 using network 500. As mentioned, network 500 can be any type of communication link or system. In a typical prior art approach, encoder 502 is a high-complexity encoder. In other words, it is necessary for encoder 502 to have a relatively large amount of processing power and other resources in order to achieve a desired compression ratio as, for example, in an MPEG-4 compression scheme. In digital video compression, the degree of complexity is highly dependent upon the type of motion prediction used in the encoder. Typically, the decoder does not do motion prediction, but relies on the results of the encoders motion prediction routines to generate the desired image information. So the prior art approach necessarily has a complex encoder and less complex decoder.

However, the prior art approach is not desirable in some applications. For example, in a case where both the encoder and decoder have low resources (e.g., as where they are each cellular telephones) it is desirable to have a low-complexity encoder and a low-complexity decoder. In such a case, the transcoding scheme of FIG. 9 can be used to advantage.

Figure 9:
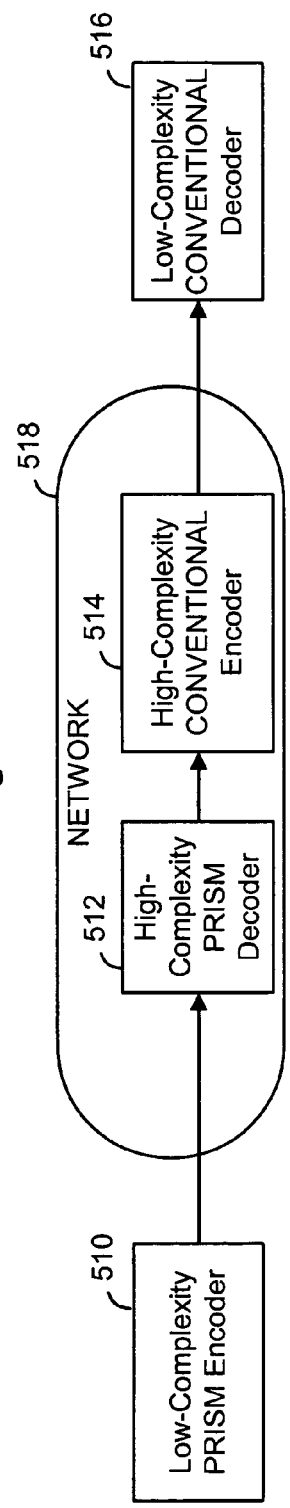
FIG. 9 shows a trans-coding approach using devices according to one or more embodiments of the present invention.

In FIG. 9, low-complexity PRISM encoder 510 uses one or more of the features described herein to encode information. For example, syndrome-based encoding as discussed above can be employed. Information that is output from encoder 510 is provided to high-complexity PRISM decoder 512. High-complexity PRISM decoder 512 can be implemented with one or more processing devices in digital network 518, rather than at end-user decoder 516. The output of high-complexity PRISM decoder 512 is decoded information that is encoded with high-complexity encoder 514 and decoded by low-complexity decoder 516, similar to those of FIG. 8. Naturally, other types of encoders and decoders, including those having features of the present invention, can be used.

In FIG. 9, the approach of a "low complexity encoder" with a "high complexity decoder" is combined with conventional "high complexity encoder" and "low complexity decoder" approaches to place the bulk of compression and coding processing into, e.g., a digital network device or a trans-coding proxy, as opposed to user devices. The trans-coding proxy can also be implemented efficiently in the framework of the invention. Instead of first completely decoding the bit-stream and then re-encoding it afresh, an efficient implementation could consist of using the predictors that have been obtained by motion search at the high complexity decoder for the conventional video encoder. In such an approach, the decoding and encoding functions of 514 and 516, respectively, can be performed in a single hardware device, as desired. Efficient transcoding algorithms are thus possible within the framework of the invention.

One way in which complexity can be allocated is to vary the degree to which an encoder and decoder perform the decoding function. Typically (and in the majority of embodiments discussed herein) an encoder does not perform decoding operations. However, for purposes of allocating complexity an encoder can perform some decoding operations, such as by applying cues to code words to determine a best cue, or matching result, or to eliminate cues that do not provide desired results. An indication of the cues tried by the encoder can be sent to the decoder to eliminate attempted operations with the undesirable cues at the decoder, thereby reducing the processing necessary at the decoder. Other approaches are possible, such as to perform other decoder operations at the encoder, or at another processing device such as a network device, etc.

Figure 10:
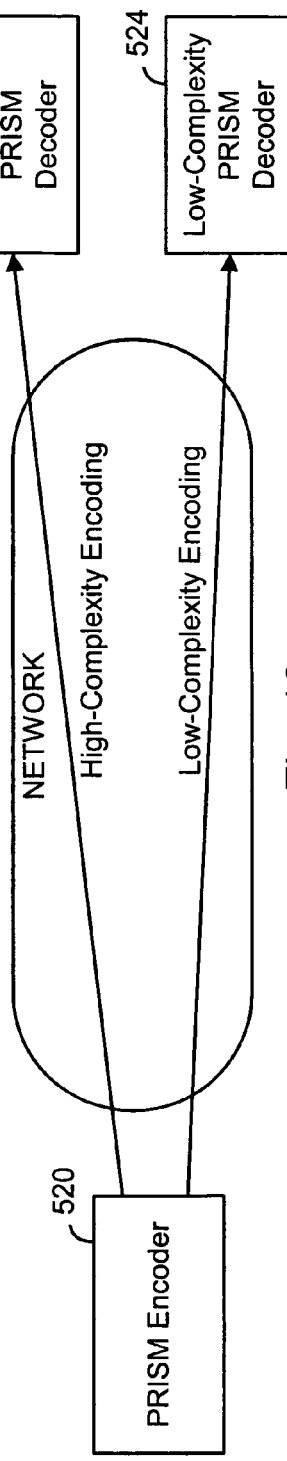
FIG. 10 illustrates allocation of complexity with two different streams.

FIG. 10 illustrates an application where a single PRISM encoder 520 adjusts the complexity of its output to suit different decoders. Decoder 522 is a high-complexity type, such as at a set-top box connected to a television set in a home. In this case, encoder 520 can do low-complexity encoding and, thus, may be able to use some of its resources for other purposes, such as, e.g., concurrently encoding another video stream. Decoder 524 is a low-complexity type of decoder, such as in a cell phone, and must be supplied with a high-complexity type of stream (i.e., a stream encoded at a high-complexity encoder using a more powerful motion prediction routine). Note that many variations of complexity are possible. The allocation of complexity, or the degree to which the encoder must use complex processing to create a desired encoded stream, can be dictated by a signal from the network, from the target decoder, or from other devices or means.

Naturally, any type of variation or allocation of complexity is possible, such as where the complexity allocation changes among one or more encoders and decoders prior to, or during, a stream's transmission. Other possible variations should be apparent.

Test Results

Preliminary test results illustrate various features discussed, above. The coding scheme tested operates well in the high quality (PSNR of the order of 30 dB) regime. Table I shows a comparison of the compression performance of the tested configuration with an H.263+ video coding system. Rate measures the total number of bits required to code the luminance part of the bit-stream.

TABLE I

| Sequence Rate (bits) | H.263+ PSNR (dB) | PRISM PSNR (dB) |
| --- | --- | --- |
| Football 1400000 | 35.42 | 34.20 |
| Euronews 1560000 | 36.91 | 35.61 |

Results are based on the first 15 frames of a Football video sequence (352×240 frame resolution) and a Euronews video sequence (320×240 frame resolution). Both sequences have high motion content and were chosen to test the validity of the PRISM approach. The latter sequence includes motion due to camera pan and zoom. The reference system is an implementation of the H.263+ video coder obtained from University of British Columbia, Vancouver. The first frame in both cases is encoded in the intra mode (i.e., every block in the first frame is encoded in the intra-coding mode). The remaining frames are encoded in the non-intra mode.

Table I summarizes the performance of the proposed video coder in comparison with the H.263+ coder. Without predictive encoding, i.e., with purely intra-frame compression, the tested scheme of the invention performs worse than H.263+ by about 1:2-1:3 dB.

To test robustness, the second frame in the video sequence was removed from frame memory. Thus, while the third frame is encoded off the second frame at the encoder it is decoded off the first frame in the H.263+ case. This leads to drift that accumulates and propagates in this case. In contrast, the decoded quality is moderately affected in PRISM and drift does not occur.

Figure 11:
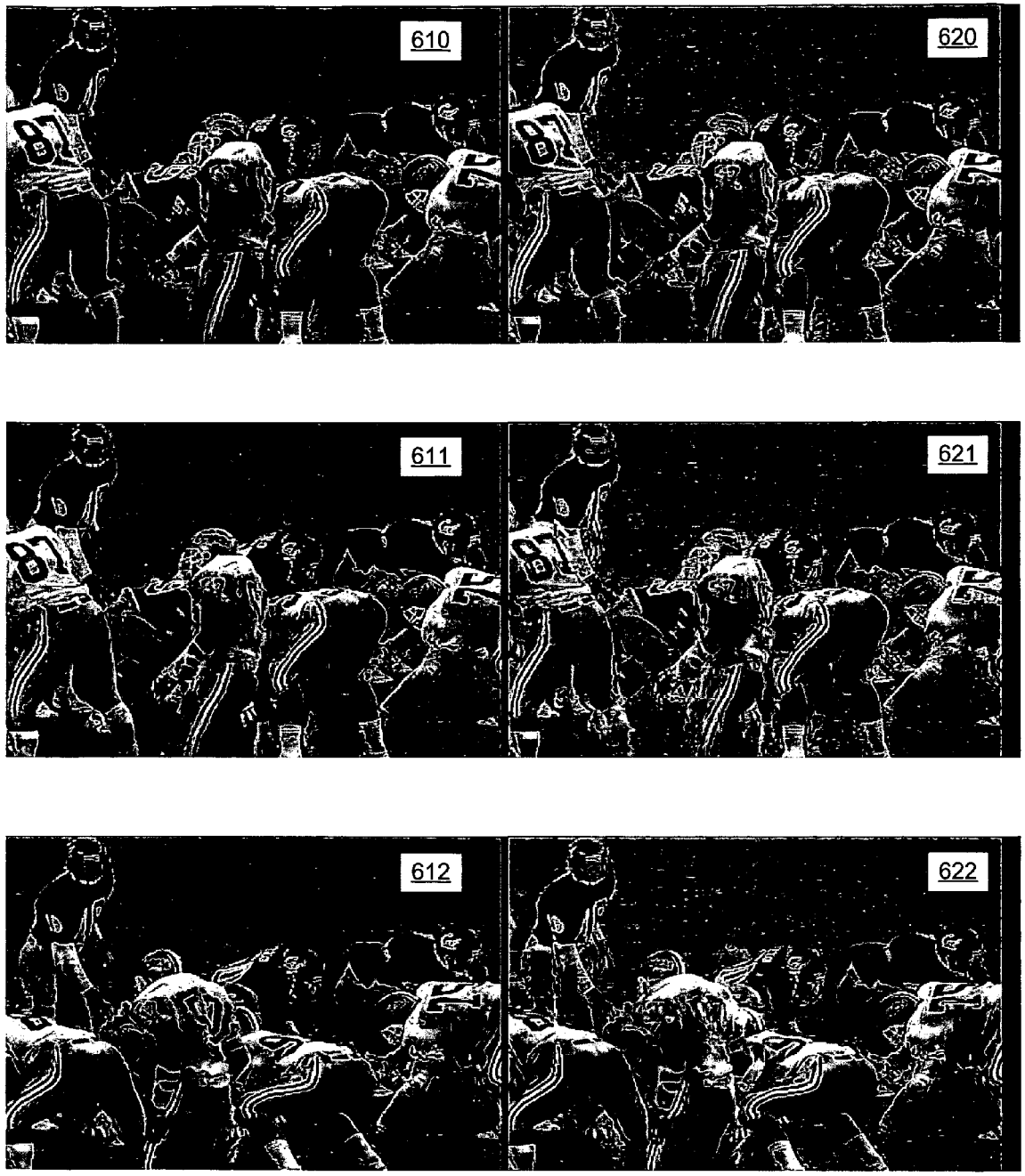
FIG. 11 shows visual quality for a test of encoding on video images.

FIG. 11 shows the decoded visual quality for the Football sequence in both cases. FIG. 11 images 610, 611 and 612 show, respectively, the decoded first, third and the fourteenth frames for the PRISM paradigm. Images 620, 621 and 622 show, respectively, the decoded first, third and the fourteenth frames for an H.263+ coder. In the decoding of the third frame, the first frame is used to generate cues at the decoder. This leads to a moderate drop in quality (of the order of 0.2 dB) with respect to the case where the second frame is used to generate cues at the decoder.

However in the case of H.263+ the drop in quality is very significant (of the order of 8 dB) leading to displeasing visual artifacts (see FIG. 8(d)) which propagate and accumulate through the remainder of the sequence (see FIG. 8(f)). In particular, the jersey number of the football player with jersey 57 is not even visible in FIG. 8(f) while it is fairly clear in FIG. 8(e). These experiments thus point out the inherent robustness of PRISM.

Although the invention has been described with respect to particular embodiments thereof, these embodiments are merely illustrative and not restrictive of the invention. For example, although various specialized terms, such as "coset,"

"predictor," "syndrome," etc., are used to describe embodiments of the invention, these words are intended to have their broader, more general definitions (including singular and plural references), such as, respectively, "set," "value," and "index," unless otherwise stated. Although specific techniques and computations are disclosed, the invention may be practiced with a wide variety of other techniques. For example, the CRC used to determine integrity of data, or a match of data to other data, can be replaced with other calculations such as a checksum, hash, signature, or any other method to identify data. In some embodiments not all of the steps disclosed herein need be used. Many such variations will be apparent to one of skill in the art.

Any suitable programming language can be used to implement the routines of the present invention including C, C++, Java, assembly language, etc. Different programming techniques can be employed such as procedural or object oriented. The routines can execute on a single processing device or multiple processors. The functions of the invention can be implemented in routines that operate in any operating system environment, as standalone processes, in firmware, dedicated circuitry or as a combination of these or any other types of processing.

Steps can be performed in hardware or software, as desired. Note that steps can be added to, taken from or modified from the steps in the flowcharts presented in this specification without deviating from the scope of the invention. In general, descriptions of functional steps, such as in tables or flowcharts, are only used to indicate one possible sequence of basic operations to achieve a functional aspect of the present invention.

In some embodiments, the space of all codewords, partition of codewords or other parameters or values need not be clearly defined, or need only be partially defined. For example, a decoder device may not be able to successfully create a complete partition due to time constraints. In such a case, successful results can still be achieved with, e.g., a portion of the partition of codewords, assuming that the target codeword is in the portion of the partition of codewords that has been created. In general, functioning embodiments may be realized with less than the complete processing described herein.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer" for purposes of embodiments of the present invention may be any processor-containing device, such as a mainframe computer, a personal computer, a laptop, a notebook, a microcomputer, a server, or any of the like. A "computer program" may be any suitable program or sequence of coded instructions that are to be inserted into a computer, well known to those skilled in the art. Stated more specifically, a computer program is an organized list of instructions that, when executed, causes the computer to behave in a predetermined manner. A computer program contains a list of ingredients (called variables) and a list of directions (called statements) that tell the computer what to do with the variables. The variables may represent numeric data, text, or graphical images.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" includes a system or mechanism that interprets and executes instructions (e.g., operating system code) and manages system resources. More particularly, a "processor" may accept a program as input, prepares it for execution, and executes the process so defined with data to produce results. A processor may include an interpreter, a compiler and run-time system, or other mechanism, together with an associated host computing machine and operating system, or other mechanism for achieving the same effect. A "processor" may also include a central processing unit (CPU) which is a unit of a computing system which fetches, decodes and executes programmed instruction and maintains the status of results as the program is executed. A CPU is the unit of a computing system that includes the circuits controlling the interpretation of instruction and their execution.

A "server" may be any suitable server (e.g., database server, disk server, file server, network server, terminal server, etc.), including a device or computer system that is dedicated to providing specific facilities to other devices attached to a network. A "server" may also be any processor-containing device or apparatus, such as a device or apparatus containing CPUs. Although the invention is described with respect to a client-server network organization, any network topology or interconnection scheme can be used. For example, peer-to-peer communications can be used.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general purpose digital computer, by using application specific integrated circuits, programmable logic devices, or field programmable gate arrays, or by using a network of interconnected components and circuits. Any communication channel or connection can be used such as wired, wireless, optical, etc.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

The scope of the invention is to be determined solely by the appended claims.

What is claimed is:

1. A method for encoding digital information, the method comprising
    identifying a target code word that represents at least a portion of the digital information;
    determining a set of a plurality of code words, wherein the set includes the target code word;
    selecting an index, wherein the index indicates the determined set;
    determining a check value for the target code word using a result of operating on the target code word with a cue; and
    sending the check value and the index to a decoder, the index allowing identification of the set of the plurality of code words and the check value allowing the target code word to be determined from the set when a check value calculated for a code word in the set of the plurality of code words when operated on by a cue indicates a match for the sent check value.

2. The method of claim 1, further comprising
    defining a plurality of sets of code words.

3. The method of claim 2, further comprising
    defining a partition of sets of code words.

4. The method of claim 1, wherein the target code word indicates one or more pixel values in digital video information.

5. The method of claim 1, wherein the target code word indicates a macro block in a frame of digital video information.

6. The method of claim 1, further comprising
    quantizing the target code word.

7. The method of claim 6, wherein the digital information includes digital video information including frames and wherein the target code word is encoded using intra-coding within a given frame of the digital video information.

8. The method of claim 7, further comprising
    using motion prediction is used to determine a correlation noise value; and
    using the correlation noise value to partition a plurality of code word values into a plurality of sets.

9. The method of claim 1, further comprising
    transforming at least a portion of the digital information from a spatial domain into a frequency domain.

10. The method of claim 9, wherein the step of transforming includes a substep of
    using a discrete cosine transform.

11. The method of claim 1, further comprising
    classifying blocks of the digital information for subsequent processing.

12. The method of claim 11, further comprising
    skipping encoding a block in response to the step of classifying blocks.

13. The method of claim 11, further comprising
    intra-coding a block in response to the step of classifying blocks.

14. The method of claim 11, further comprising
    performing varying degrees of encoding in response to the step of classifying blocks.

15. An apparatus for encoding digital information, the apparatus comprising
    a process for identifying a target code word that represents at least a portion of the digital information;
    a process for determining a set of a plurality of code words, wherein the set includes the target code word;
    a process for selecting an index, wherein the index indicates the determined set;
    a process for determining a check value for the target code word using a result of operating on the target code word with a cue; and
    a process for sending the check value and the index to a decoder, the index allowing identification of the set of the plurality of code words and the check value allowing the target code word to be determined from the set when a check value calculated for a code word in the set of the plurality of code words when operated on by a cue indicates a match for the sent check value.

16. A computer-readable medium storing computer instructions for encoding digital information, the computer instructions comprising
    one or more instructions for identifying a target code word that represents at least a portion of the digital information;
    one or more instructions for determining a set of a plurality of code words, wherein the set includes the target code word;
    one or more instructions for selecting an index, wherein the index indicates the determined set;

one or more instructions for determining a check value for the target code word using a result of operating on the target code word with a cue; and one or more instructions for sending the check value and the index to a decoder, the index allowing identification of the set of the plurality of code words and the check value allowing the target code word to be determined from the set when a check value calculated for a code word in the set of the plurality of code words when operated on by a cue indicates a match for the sent check value.

17. An apparatus for decoding encoded digital information, the apparatus comprising
   a process for receiving an index and a check value, the check value generated by an encoder using a result of operating a cue on a target code word;
   a process for using the index to determine a set of candidate code words;
   a process for inferring a set of cues;
   a process for determining a code word by operating on the code words in the set of the candidate code words with a cue;
   a process for determining if the determined code word is the target code word when a check value calculated for the code word in the set of the plurality of code words when operated on by the cue indicates a match for the received check value; and
   a process for using the target code word in a decoding operation.

18. A computer-readable medium storing computer instructions for decoding encoded digital information, the computer instructions comprising
   one or more instructions for receiving an index and a check value, the check value generated by an encoder using a result of operating a cue on a target code word;
   one or more instructions for using the index to determine a set of candidate code words;
   one or more instructions for inferring a set of cues;
   one or more instructions for determining a code word by operating on the code words in the set of the candidate code words with a cue;
   one or more instructions for determining if the determined code word is the target code word when a check value calculated for the code word in the set of the plurality of code words when operated on by the cue indicates a match for the received check value; and
   one or more instructions for using the target code word in a decoding operation.

19. A method for decoding encoded digital information, the method comprising
   receiving an index and a check value, the check value generated by an encoder using a result of operating a cue on a target code word;
   using the index to determine a set of candidate code words;
   inferring a set of cues;
   determining a code word by operating on the code words in the set of candidate code words with a cue;
   determining if the determined code word is the target code word when a check value calculated for the code word in the set of the plurality of code words when operated on by the cue indicates a match for the received check value; and
   using the target code word in a decoding operation.

20. The method of claim 19, further comprising
   determining a cue in the set of cues;
   using the cue to determine a code word in the code words in the set; and
   determining whether the code word produces a check value that is in agreement with the received check value.

21. The method of claim 19, wherein the cue includes a motion-based predictor.

22. The method of claim 21, wherein the step of inferring a cue includes a substep of
   deriving the motion-based predictor.

23. The method of claim 22, wherein the encoded digital information includes blocks of video information, the method further comprising
   decoding the encoded digital information by using the predictor and one or more code words.

24. The method of claim 23, further comprising
   estimating the best way to decode the encoded digital information by using the predictor and the one or more code words.

25. The method of claim 19, wherein the encoded digital information corresponds to a source that can be compressed by predictive coding, wherein the decoder includes two or more cues that produce a value that is in agreement with the check value to result in successful recovery of the target codeword.

26. A method for sharing processing complexity between an encoding process and a decoding process, wherein the encoding process and the decoding process each use an index for a target codeword, a check value for the target codeword and a set of candidate cues, the method comprising
   using the encoder to perform the following steps:
   selecting some cues from the set of candidate cues;
   operating these cues on the indexed set of codewords;
   generating a check value as a result of the operating step;
   determining whether the check value matches the check value for the target codeword;
   signaling whether the chosen cues were successful in determining the correct codeword to the decoder;
   using the decoder to perform the following steps:
   selecting other cues from the set of candidate cues;
   operating these cues on the indexed set of codewords based on the signal determined by the encoder;
   generating a check value as a result of the operating step;
   determining whether the result of the operating step produces a value that is in agreement with the check value for the target codeword.

27. The method of claim 26, wherein the encoding process does not use any of a set of candidate cues corresponding to a lower complexity level, wherein the decoding process uses all of a set of candidate cues corresponding to a higher complexity level.

28. The method of claim 26, wherein the encoding process uses all of a set of candidate cues corresponding to a higher complexity level, wherein the decoding process uses one of a set of candidate cues corresponding to a lower complexity level.

* * * * *